July 15, 1952  L. HORNBOSTEL  2,603,380
HEAD AND SHELL JOINT FOR DRIER DRUMS
Filed March 2, 1946
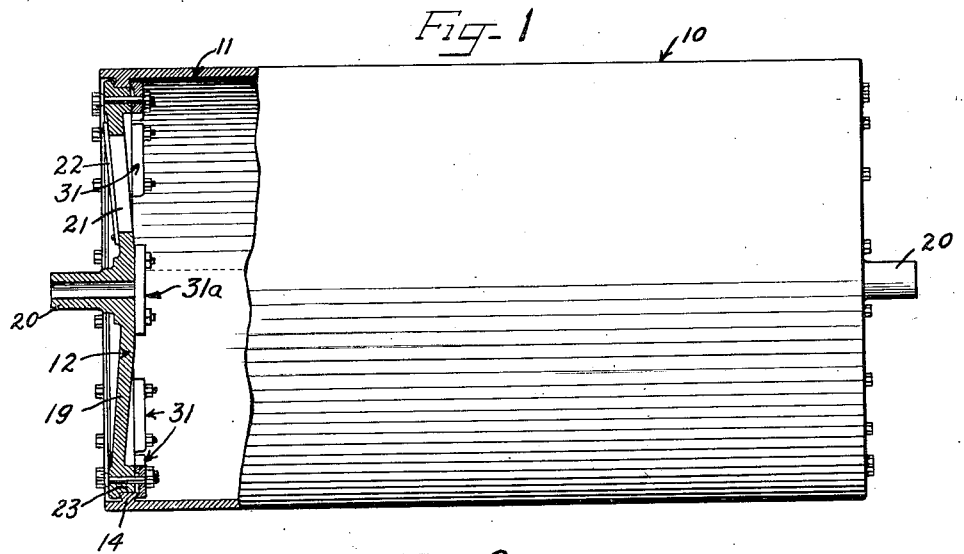
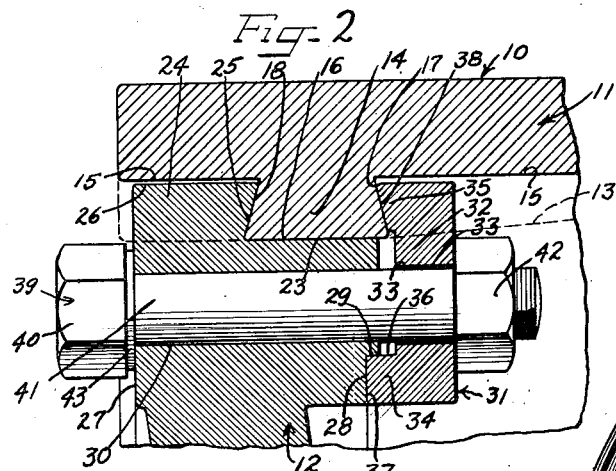
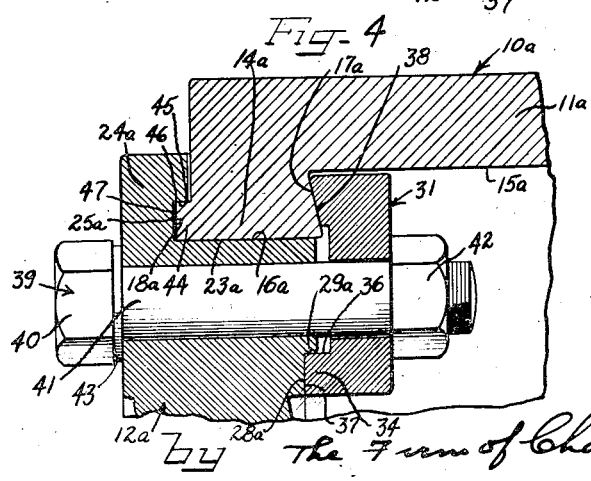
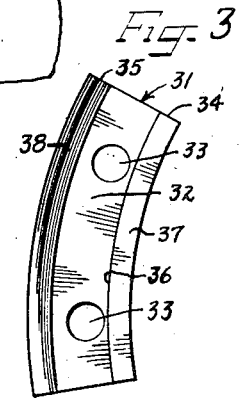
Inventor
LLOYD HORNBOSTEL Patented July 15, 1952

2,603,380

UNITED STATES PATENT OFFICE 2,603,380

HEAD AND SHELL JOINT FOR DRIER DRUMS

Lloyd Hornbostel, Beloit, Wis., assignor to Beloit Iron Works, Beloit, Wis., a corporation of Wisconsin Application March 2, 1946, Serial No. 651,577

6 Claims. (Cl. 220—55)

This invention relates to drum constructions and particularly to arrangements for securing heads onto drum shells.

The invention will hereinafter be specifically described as embodied in drier drums for paper making machines but it should be understood that the invention is not limited to such usage being generally applicable to the connection of heads and shells in firm locked together and sealed relationship.

In accordance with this invention a cylindrical shell such as a cast metal drier drum shell, is provided with integral inwardly projecting ribs adjacent the ends thereof. These ribs preferably have reentrant or back sloping inner side faces. In one embodiment of the invention both the inner and outer side faces of the ribs have back sloping or reentrant contours to provide a dovetail cross section for the ribs. In another embodiment of the invention the outer face of the rib has an axially extending pilot portion providing a shoulder around the rib. The inner peripheral walls of the ribs are machined flat. The drum heads have outer peripheral walls machined flat to a diameter somewhat greater than the flat inner peripheral walls of the ribs for press fitting relationship in said ribs. The drum heads have radial extending flanges overlying the outer faces of the ribs and contoured to fit these outer faces. The drum heads preferably have recessed inner faces radially inward from their outer peripheral walls to provide shoulders parallel to these walls. A plurality of arcuately shaped clamps are positioned at spaced intervals in the shell around the ribs thereof and have legs respectively overlying the ribs and recessed inner faces of the drum heads with one of the legs lying adjacent the shoulders of the drum heads. These legs have thrust faces parallel to the reentrant inner side edges of the ribs and recessed faces of the drum heads respectively. Draw bolts are passed through the drum heads and clamps to draw the clamps tightly against the ribs and drum heads thereby locking the drum heads to the shell. Each drum head is securely clamped to a rib and the reentrant engaging surfaces of the rib and clamp cooperate with the shoulder on the inner face of the drum head to hold the flat peripheral walls of the rib and drum head together in press fit sealed engagement even when radial expanding forces are exerted on the shell.

It is then an object of this invention to provide a head and shell joint for fitting drum heads to drum shells in firm sealed relationship.

Another object of this invention is to provide a head and shell construction arranged for quick connection of a drum end or head to a drum shell.

A still further object of this invention is to decrease the cost of attaching drum ends or heads to drum shells.

Another object of this invention is to provide a clamp arrangement for fitting drum heads to drum shells.

A still further object of this invention is to eliminate the heretofore necessary drilling of bolt holes in drum shells for attaching drum ends to the shell.

A still further object of the invention is to provide a bridging clamp arrangement for locking heads to shells without perforating the shells.

Other and further objects of the invention will be apparent to those skilled in the art from the following detailed description of the annexed sheet of drawings, which, by way of preferred examples only, illustrate two embodiments of the invention.

On the drawings:

Figure 1 is an elevational view of a paper making machine drier drum having a head and shell joint according to this invention and illustrating parts in axial cross section to show the joint construction of the invention.

Figure 2 is an enlarged fragmentary axial cross sectional view of one form of head and shell joint according to this invention.

Figure 3 is a plan view of an arcuate clamp used in the joints of this invention.

Figure 4 is a view similar to Fig. 2 illustrating a modified embodiment of the joint.

As shown on the drawings:

In Figs. 1 and 2 the reference numeral 10 designates a paper machine drier drum composed of a cylindrical metal shell 11 and end heads such as 12. As indicated by the dotted line in Fig. 2, the shell 11 is initially formed by casting tapered thickened end portions 13 therein. These portions 13 are provided on the inside of the cast shell adjacent both ends thereof. The tapered portions are then machined to form an internal rib 14 adjacent each end of the shell. The rib 14 projects radially inward from the machined cylindrical inner wall 15 of the shell and has a flat machined inner peripheral wall 16 together with a back sloping or reentrant inner side edge or face 17 and a similar back sloping or reentrant outer side edge or face 18. The rib 14 therefore has a dovetail cross section and is widest at the inner peripheral wall 16 thereof. This rib 14 is inexpensively formed by machining of the tapered end of the cast shell 11.

As shown in Fig. 1, the head 12 has a concave main web or body portion 19 with a central hub 20 projecting outwardly therefrom for supporting the drum 10. The main body 19 has a large aperture 21 therein to give access to the interior of the drum 10. This aperture is closed by a plate 22 bolted to the body 19.

The periphery of the head 12 is thicker than the body 19 thereof and has a flat machined outer peripheral wall 23 sized for press fit engagement in the rib 14 on the inner peripheral wall 16 of the rib. The head 12 has a radially extending flange 24 adjacent the peripheral wall 23 thereof and formed with a reentrant inner side edge or wall 25 for overlying the outer side edge 18 of the rib 14 as shown in Fig. 2. This flange 24 has an outer peripheral wall 26 freely fitting within the cylindrical wall 15 of the shell 11 on the outside of the rib 14.

The head 12 has a flat outer face 27 extending radially inward from the outer peripheral wall 26 of the flange 24 thereof. A recessed flat radially extending inner wall 28 is provided on the inner face of the head 12 and this wall 28 is surrounded by an axially extending shoulder 29.

A plurality of bolt holes 30 are drilled axially through the thickened peripheral or rim portion of the head 12 and lie between the peripheral wall 23 and the shoulder 29 in parallel relationship therewith.

A plurality of segmental circular clamps 31 are provided for locking the head 12 to the shell 11. These clamps 31 are struck from a radius centered on the center of the drum head 12. Each clamp 31 has a central web portion 32 with a plurality of bolt holes 33 therethrough. A leg 34 projects from the web portion 32 along the inner edge of the web. A second leg 35 projects from the web portion 32 along the outer edge of the web. The legs 34 and 35 extend in the same direction from the same face of the web. The leg 34 has an inner edge 36 adapted to overlie the shoulder 29 of the head 12 and to be bottomed on this shoulder. This leg 34 has a flat face 37 adapted to overlie and meet with the recess face 28 of the head 12. The leg 35 has a reentrant or inwardly sloping thrust face 38 adapted to overlie the inner side face or edge 17 of the rib 14.

Draw bolt assemblies are provided to tighten the clamps 31 against the rib 14 and head 12 in bridging relation to the shell and head as shown in Fig. 2 for locking the head in the shell. These draw bolt assemblies are composed of bolts 39 having heads 40 overlying the flat wall 27 of the drum head 12 and having shanks 41 projecting through the bolt holes 30 of the drum head 12 and through the apertures 33 of the clamp 31, together with nuts 42 threaded on the portions of the shank 41 projecting beyond the clamp 31. Gaskets 43 composed of copper or the like are disposed around the shanks 41 of the bolts between the heads 40 and wall 27 of the drum head 12.

The nuts 42 are tightened against the clamps 31 and the bolts will draw the clamps to firmly bottom the thrust faces 37 and 38 of the clamps against the face 28 of the drum and the face 17 of the rib respectively. At the same time the face 25 of the head flange 24 is drawn tightly against the face 18 of the rib 14. The shoulder 29 of the head 12 will engage the leg edge 36 of the clamp 31 to hold each clamp 31 against radial outward displacement. The reentrant engaging thrust faces of the shell rib and clamp together with the similar reentrant engaging faces of the drum head and shell rib will tend to draw the shell radially inward to maintain the press fit relationship of the rib wall 16 and head wall 23. Radial expanding forces tending to loosen this press fit relationship of the head and shell are thereby effectively resisted.

The drum ends or heads are, according to this invention, readily mounted in the drum shell by a clamp arrangement which maintains press fit engagement of the shell with the head or end. The clamps are easily tightened since an operator can insert a wrench through the hole 21 of the head 12 for tightening the nuts 42. By tightening the nuts 42 the heads 40 of the bolts 39 are held from rotating by means of wrenches or the like so that the gaskets 43 are never subjected to shearing action between the bolt heads and drum head face 27.

A sufficient number of clamps 31 are used around the periphery of the rib 14 to uniformly distribute clamping tension around the rib. The use of a plurality of bolts for each clamp prevents the clamps from being rotated with the nut during the tightening operation and facilitates the tightening operation. Of course, if desired, the plurality of apertures 33 in the clamp 31 could be replaced with an elongated slot for receiving a plurality of bolts.

In the embodiment of the invention shown in Fig. 4, the drier drum 10a is composed of a cylinder 11a and a head or end 12a. The same clamp 31 and draw bolt assembly 39, described above in connection with Figs. 1 to 3, is used to secure the head 12a to the cylinder 11a. The cylinder 11a has an internal rib 14a at its very end. This rib 14a projects inwardly from the inner cylindrical wall 15a of the cylinder to a flat cylindrical wall 16a for receiving the peripheral wall 23a of the end 12a in press fit relation. The inner side edge 17a of the rib 14a slopes backward in the same manner as described in connection with Figs. 1 to 3 to receive the thrust face 38 of the clamp 31 thereagainst. The head 12a has a recessed inner face 28a and a shoulder 29a similar to the face 28 and shoulder 29 of the head 12 described above for receiving respectively the thrust face 37 and the inner edge 36 of the clamp leg 34.

The end of the cylinder 11a has a pilot portion 44 projecting axially around the outer face of the rib 14a to provide a shoulder 45 and an outer flat face 18a on the rib 14a. The inner peripheral wall 16a of the rib 14a extends through the pilot portion 44.

The drum head 12a has a radial flange 24a with a recessed inner side face 25a receiving the pilot portion 44 and providing a side wall 46 receiving the shoulder 45 of the pilot portion. A gasket or packing material 47 is interposed between the end face 18a of the pilot portion 44 and the bottom of the recess 25a.

The rib 14a is therefore engaged between clamp face 38 and the recess face 25a of the drum head 12a. The arrangement functions in the same manner as described in connection with Figs. 1 to 3 for maintaining the rib face 16a and the drum head face 23a in press fit relationship. The packing 47 affords an additional seal eliminating leakage from the drum.

From the above description it will be understood that this invention provides a joint construction for securing heads or ends to shells wherein clamps and draw bolts firmly secure the heads to the shells and eliminate heretofore necessary expensive shell constructions since the shells need not be equipped with bolt holes, flanges and the like.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A head and shell joint for drums comprising a cylindrical drum shell having an inwardly projecting rib around the inside thereof with a reentrant inner side face and a flat inner peripheral wall, a circular drum head having a flat outer peripheral wall press fitted into said rib on said inner peripheral wall thereof and having a radial flange portion bottomed on the outer side face of said rib, said drum head having a recessed inner face portion radially inward from said outer peripheral wall thereof and surrounded by a shoulder parallel to said outer peripheral wall, said head having bolt holes therethrough parallel to said outer peripheral wall and lying between said wall and shoulder, a plurality of clamps in said shell having segmental circular contours struck from a radius centered on the center of the circular drum head, each clamp having a multi-apertured central web portion with parallel legs extending from one end face thereof respectively toward said rib and snugly fitting into said shoulder of the head, said legs having thrust faces parallel to and respectively overlying the reentrant inner side face of said rib and said recessed inner face of the drum head, bolts having heads overlying the outer face of the drum head and shanks extending through the bolt holes of the drum head and apertures of the clamps, gaskets on said shanks between the bolt heads and outer face of the drum, and nuts threaded on said bolts thrusting against the webs of the clamps to draw the thrust faces of the clamps tightly against the reentrant face of the rib and the recessed inner face of the drum whereby said drum head is securely fitted to said shell and said clamps cooperate with the reentrant face of the rib and said shoulder of the drum head to resist radial expansion of the shell away from the drum head.

2. A head and shell joint construction comprising a cylinder having a radially inwardly projecting rib around the inside thereof with a reentrant inner side face and an annular inner peripheral face, a drum head having a peripheral portion snugly fitting in said rib abutting said inner peripheral face and having a flange portion adapted to thrust against the outer side face of the rib, said drum head also having a peripherally extending shoulder on the inner radial face thereof, a plurality of clamps inside said drum spaced around said rib and having spaced legs with thrust faces respectively parallel to and overlying the reentrant inner face of the rib and engageable with the radially inward face of said shoulder of the drum head, and draw bolt assemblies extending through the drum head and the clamps for tightening the thrust faces of said clamps against the reentrant inner face of the rib and the inner face of said drum head shoulder, respectively.

3. A drum construction comprising a drum shell free of holes for head attaching bolts and having a radially inwardly extending internal annular rib therearound, said rib having spaced oppositely inclined reentrant side thrust faces, a drum head extending into said rib and having an annular inclined side thrust face snugly abutting one of the side thrust faces of the rib, clamps in said shell each having a first inclined side thrust face conforming with and snugly abutting the other reentrant thrust face of the rib and a second radially inwardly spaced concentric thrust face mating with an adjacent head portion, and draw bolts extending through the head and through the clamps between the thrust faces of the clamps for tightening the head against the rib and the clamps against the rib and the head with the clamp thrust faces locking the shell and the head together.

4. A drum construction comprising a drum shell free of bolt holes and having a radially inwardly extending internal annular rib therearound, said rib having an interior reentrant side thrust face and a concentric outer side thrust face, a drum head extending into said rib and having an annular outer side thrust face mating with and snugly abutting the outer side thrust face of the rib and an inner recessed annular side thrust face spaced radially and axially of the head from said outer head thrust face, clamps in said shell having spaced concentric side thrust faces contacting the rib and the head inner side thrust face, the clamp thrust face contacting said rib being inclined to snugly abut the rib interior reentrant thrust face, and draw bolts extending through the head and clamps for tightening the clamps against the rib reentrant face and the head inner thrust face, the clamp thrust faces tightly engaging said rib and said head to lock the shell and the head together with the rib and head outer thrust faces being in snug engagement.

5. A fluid pressure sealed drum construction comprising a shell having an integral inwardly projecting annular internal rib adjacent an end thereof, said rib having reentrant side faces and an annular terminal face, a drum head having a peripheral wall fitting in said rib to abut said terminal face and a flange with a reentrant face opposing the outer side face of the rib, said head having an inner annular terminal face radially inwardly from said inner side face of the rib, a plurality of clamps in said shell, said clamps having reentrant side faces overlying the inner reentrant side face of the rib together with leg portions spaced radially inwardly from the reentrant side faces thereof overlying the terminal face of the head, and draw bolts extending through said head and clamps for tightening the clamps against the inner side face of said rib and the inner terminal face of said head to lock the head and shell together with the head peripheral wall snugly fitting in the rib terminal face and the rib and head reentrant faces in extended contact to form a sealed drum end.

6. A fluid pressure sealed drum construction comprising a drum shell having an integral internal rib at an end thereof, said rib having a reentrant inner side wall and a flat cylindrical inner peripheral wall together with a projecting pilot portion on the outer side wall thereof, a drum head having an annular shoulder snugly fitting said flat cylindrical wall of said rib and having a recessed radial flange receiving said pilot portion, a plurality of clamps in said shell having thrust faces respectively engaging substantially radially aligned portions of the head and the inner side wall of the rib, said clamp thrust faces engaging the rib reentrant wall being complementary thereto, and draw bolts extending through the head and clamps to lock the drum head to the drum shell.

LLOYD HORNBOSTEL.

REFERENCES CITED

The following references are of record in the file of this patent:

UNITED STATES PATENTS

| Number | Name | Date |
|---|---|---|
| 560,309 | White | May 19, 1896 |
| 1,080,859 | Stamm | Dec. 9, 1913 |
| 1,092,847 | Millspaugh | Apr. 14, 1914 |
| 1,113,515 | Ullman | Oct. 13, 1914 |
| 1,219,217 | Arndt | Mar. 13, 1917 |
| 1,846,456 | Robertson et al. | Feb. 23, 1932 |
| 1,868,657 | Brown et al. | July 26, 1932 |
| 1,928,396 | Seck | Sept. 26, 1933 |
| 2,343,502 | Fields | Mar. 7, 1944 |

FOREIGN PATENTS

| Number | Country | Date |
|---|---|---|
| 190,482 | Great Britain | June 7, 1923 |